United States Patent [19]

Hancock et al.

[11] Patent Number: 4,503,283

[45] Date of Patent: Mar. 5, 1985

[54] CABLE STUB ASSEMBLY AND METHODS OF MAKING

[75] Inventors: Harvey G. Hancock, Dunwoody, Ga.; Michael E. Szymanski, Elkhorn, Nebr.

[73] Assignee: AT&T Technologies, Inc., New York, N.Y.

[21] Appl. No.: 499,064

[22] Filed: May 27, 1983

[51] Int. Cl.³ .................... H02G 15/08; H02G 15/24; H02G 1/14

[52] U.S. Cl. .................... 174/22 R; 29/869; 156/49; 174/76; 174/78

[58] Field of Search ................. 174/21 R, 21 C, 22 R, 174/76, 78, 88 R, 88 C, 93; 156/48, 49; 29/868, 869

[56] References Cited

U.S. PATENT DOCUMENTS

| Re. 28,468 | 6/1975 | Baumgartner et al. | 174/88 R |
|---|---|---|---|
| 3,297,819 | 1/1967 | Wetmore | 174/21 R |
| 3,499,972 | 3/1970 | Smith | 174/78 |
| 3,539,709 | 11/1970 | Brancaleone | 174/75 |
| 3,619,481 | 11/1971 | Smith | 174/76 X |
| 3,770,871 | 11/1973 | Goodman | 174/22 R X |
| 3,781,461 | 12/1973 | Thompson et al. | 174/76 X |
| 3,885,087 | 5/1975 | Takada et al. | 174/93 |
| 3,915,540 | 10/1975 | Thompson et al. | 174/78 X |
| 4,015,329 | 5/1977 | Hutchison | 174/76 X |
| 4,025,145 | 5/1977 | Shaffer et al. | 174/90 X |
| 4,025,717 | 5/1977 | Whittingham | 174/76 |
| 4,142,592 | 3/1979 | Brusselmans | 156/49 X |
| 4,152,538 | 1/1979 | Gassinger et al. | 174/76 X |

FOREIGN PATENT DOCUMENTS 1435560 5/1976 United Kingdom .................. 174/93

OTHER PUBLICATIONS

Fukutomi, H. et al., Prefabricated Pressure Dam for Telephone Cable, 20th Int'l Wire and Cable Symposium, Atlantic City, N.J., Nov. 3–Dec. 2, 1971.

Azuma, M. et al., Development of Cable with Gas-stoppage Dam by Polyethylene Mold Process, Proceedings at the 25th Wire and Cable Symposium, Cherry Hill, N.J., Nov. 16–18, 1976.

Primary Examiner—John Gonzales
Assistant Examiner—Morris H. Nimmo
Attorney, Agent, or Firm—E. W. Somers

[57] ABSTRACT

In a cable stub assembly (20) which is used to interconnect two cables (22 and 24), at least one of which is pressurized with a gaseous medium, a portion of a plastic jacket is removed from an interior portion of a length (31) of cable to expose conductors (33—33) of a core (32). Heat shrinkable sleeves (61 and 66) each of which comprises an irradiation cross-linked polyolefin material are positioned over the jacket of the cable on each side of the interior portion from which the jacket has been removed. The heat shrinkable sleeves are caused to contract about the cable jacket. Inner surfaces of the sleeves are coated with an adhesive material which is helpful in providing a sealed engagement of the sleeves with the jacket. A length of tubing (81) is disposed about the cable jacket and the contracted sleeves. A polyurethane filling material (82) is introduced into the tubing and is adhered sufficiently to the sleeves to prevent substantially the escape of the gaseous medium from the at least one cable. In the event that the cable includes a metallic shield (37), grounding clamp connections are made to the shield on each side of the exposed conductors. A plastic tape (58) having an adhesive coating is used to prevent the egress of the gaseous medium where a post (56) of each grounding clamp extends through an associated sleeve.

16 Claims, 14 Drawing Figures

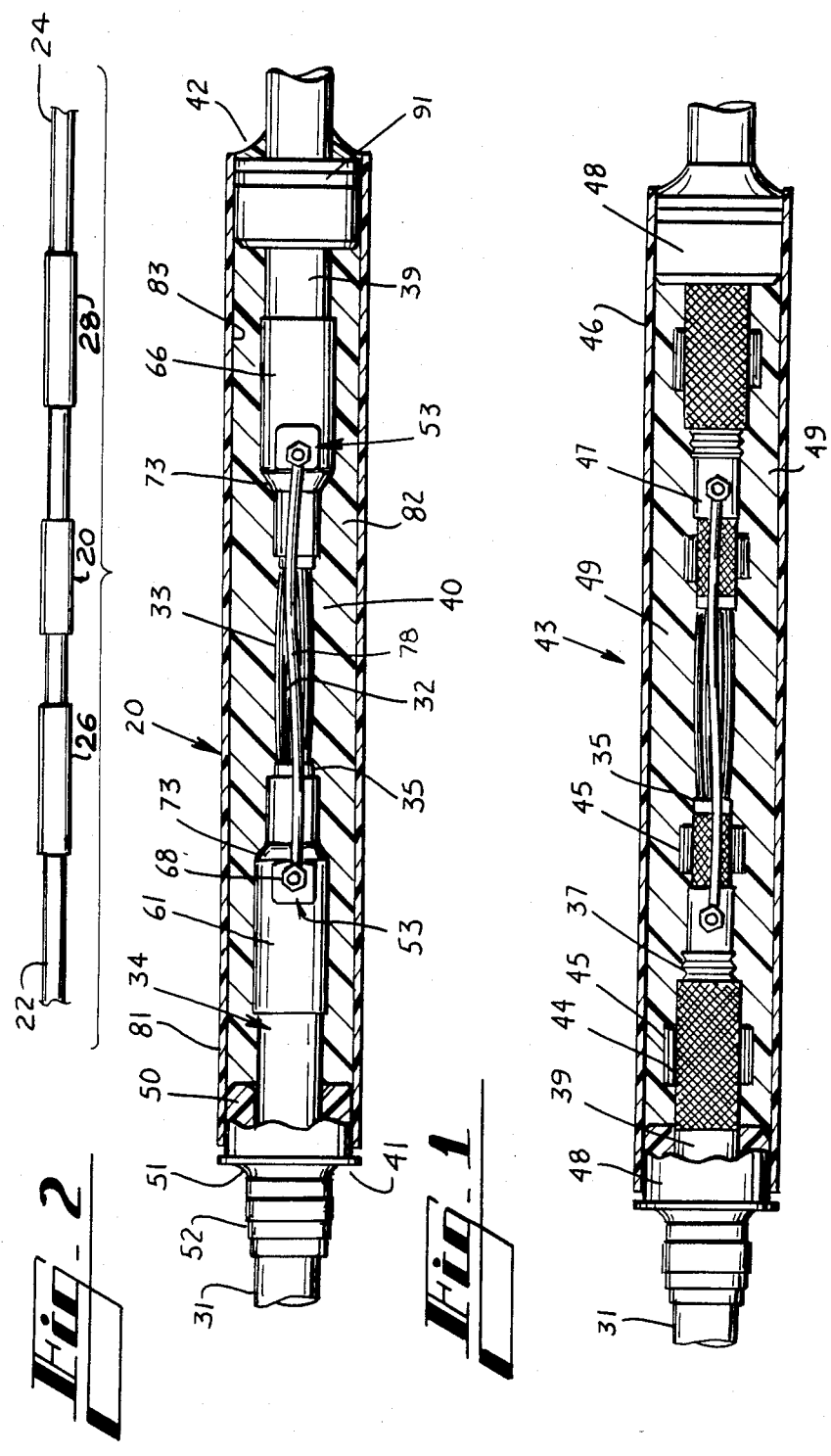

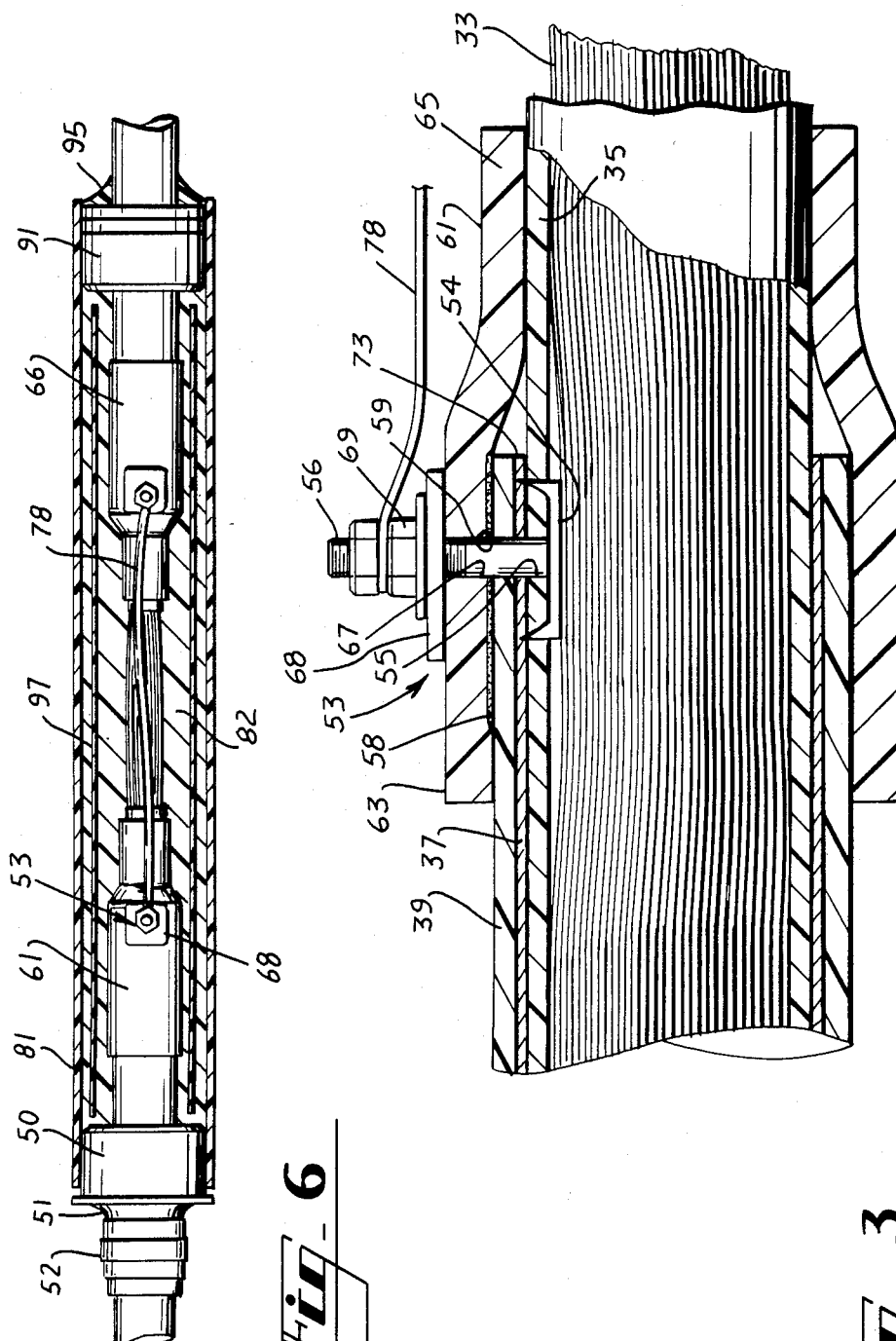

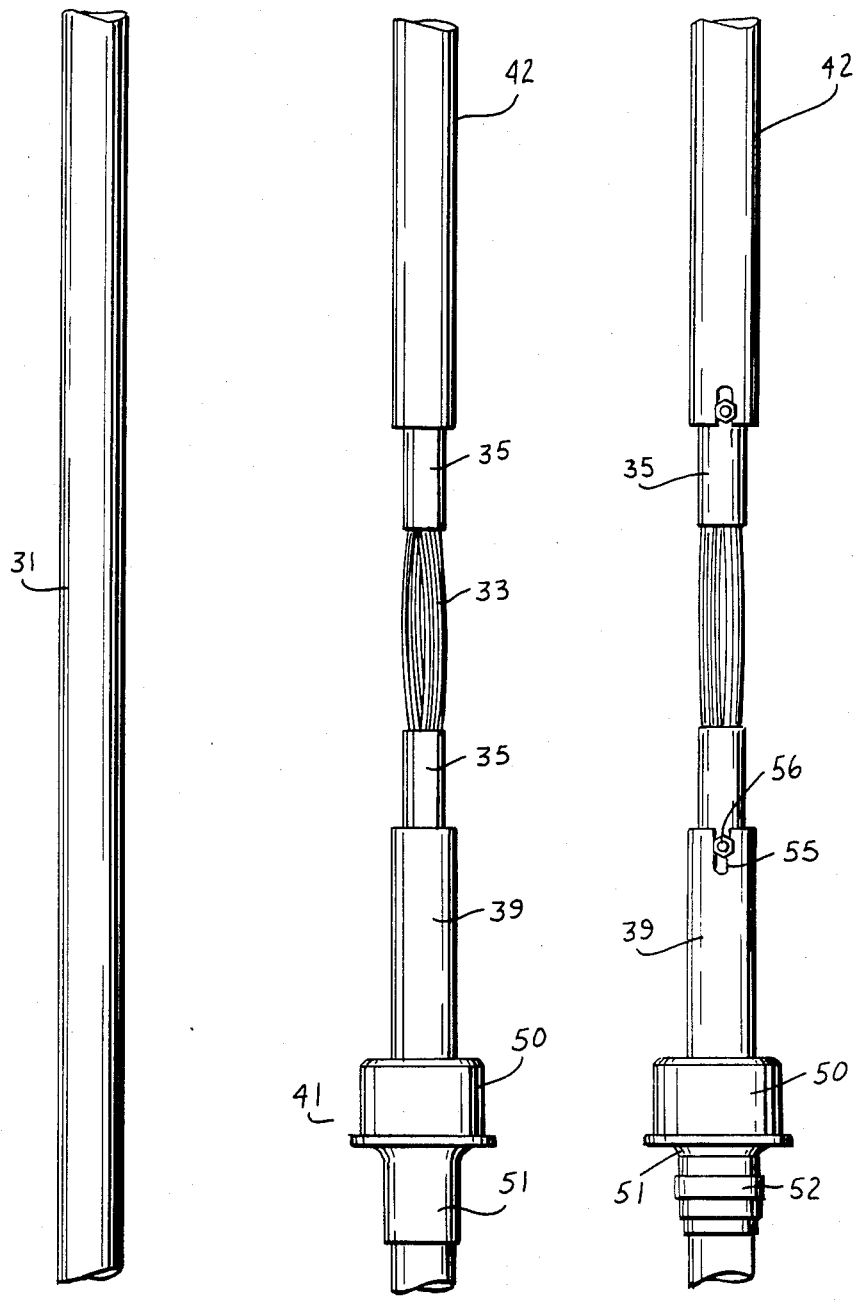

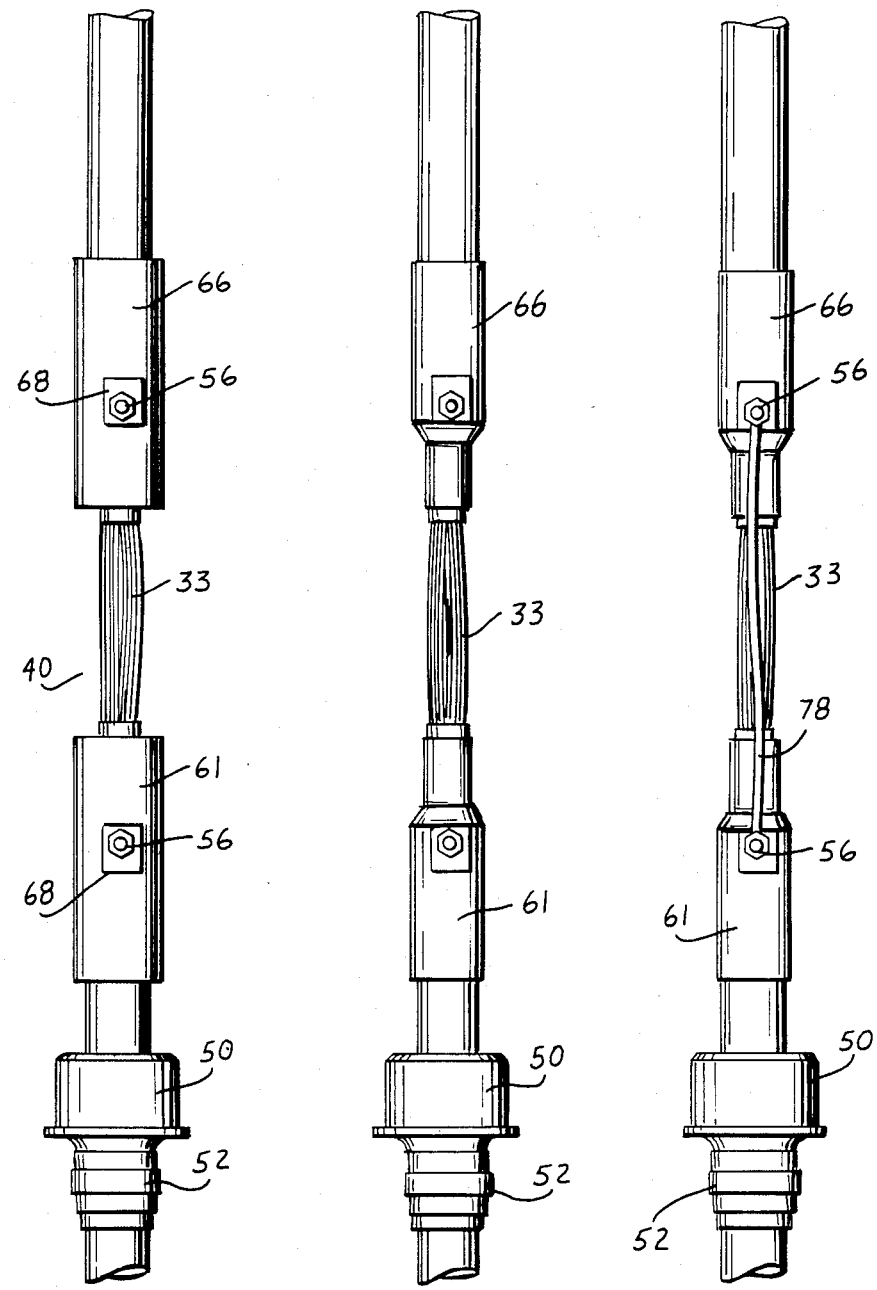

CABLE STUB ASSEMBLY AND METHODS OF MAKING

TECHNICAL FIELD

This invention relates to a cable stub assembly and to methods of making same. More particularly, it relates to a cable stud assembly which is used to interconnect two cables and which prevents the loss of a gaseous medium with which one of the cables is pressurized.

BACKGROUND OF THE INVENTION

A communications cable generally includes a core of a plurality of individually insulated conductors enclosed in a sheath system. Typically, the sheath system includes a metallic shield and one or more plastic jackets. Cables such as these must be spliced together in the field. The splices are made by connecting corresponding conductors of the cables and by carrying electrical continuity across the splices between the metallic shields to provide protection against lightning, for example.

In some instances, these cables are filled with a gaseous medium such as nitrogen in order to prevent the ingress of moisture which could affect the quality of transmission. In these cables, which are referred to as pressurized cables, the gaseous medium not only fills the interstices between the conductors but also the space between components of the sheath system such as, for example, between the shield and the inner and outer plastic jackets. A splice between lengths of pressurized cables is protected by a reenterable closure which encloses the spliced conductors and an adjacent portion of each length of cable. Generally, the closure is sealed to allow the pressurized gaseous medium to extend through the splice.

Whenever a pressurized cable is connected to a non-pressurized cable, it becomes necessary to insure against the loss of the gaseous medium. Consequently, a non-pressurized cable is not directly spliced to a pressurized cable. Instead, this connection generally is accomplished by interposing an arrangement which is referred to as a cable stub assembly between the pressurized and the non-pressurized cables. The cable stub assembly is manufactured in a factory environment and is connected to the pressurized and non-pressurized cables in the field. It includes provisions for preventing the egress of the gaseous medium from the pressurized cable.

In one cable stub assembly, a portion of an outer jacket is removed from the interior of a length of cable. Then a shorter portion of a metallic shield and a still shorter portion of an inner jacket are removed to expose a core which comprises a plurality of insulated conductors. A portion of the outer jacket on each side of the exposed conductors is scuffed as is a portion of the inner jacket. A tape which adheres to the plastic of the jackets is wrapped about each scuffed portion. Over these tapes are wrapped other tapes which are stretched as they are wrapped about the underlying tapes to apply pressure thereto. A length of plastic tubing is positioned to enclose the portion of the cable which includes the exposed conductors and portions of the sheath system to each side thereof. A plastic filling material is introduced into the tubing to enclose the conductors and to adhere to the overlying tapes. Leakage persists with this kind of cable stub assembly, possibly because the scuffing and wrapping of the tapes are craft-sensitive operations.

In another prior art arrangement, turns of a tape are wrapped about the length of cable on each side of the exposed conductors. A plastic bag is disposed about the conductors and filled with a fluid plastic material. The bag is kneaded manually to cause the plastic material to be moved into the cable at each end of the exposed conductors to seal the ends of the jacketed portions. Then a heat shrinkable sleeve which had been prepositioned over one end of the cable is moved to enclose the exposed conductors and adjacent end portions of the jacket. Afterwards, the heat shrinkable sleeve is caused to be contracted about the cable end portions and the plastic bag.

Other solutions to the problem of providing pressurized cable seals have been proposed in the prior art. M. Azuma et al in a paper entitled "Development of Cable with Gas—Stoppage Dam by Polyethylene Mold Process," which appears at pages 312-315 of the Proceedings of the 25th International Wire and Cable Symposium held Nov. 16-18, 1976, proposed the use of injection molding to solve the problem of sealing a gas-pressurized cable. This process requires substantial investment in facilities and requires precise control of temperatures.

There still remains a need for an economical effective means which provides a connection between a pressurized cable and a non-pressurized cable and which prevents the escape of a gaseous medium from the pressurized cable. Any solution to this problem should comprise a cable stub assembly which is easily installed under field conditions. Also, the assembly should be one which is useable with those cables that include metallic shields and which includes facilities for carrying the continuity of the shields across the exposed conductors.

SUMMARY OF THE INVENTION

The cable stub assembly and the methods of making the cable stub assembly of this invention provide an economical effective solution to the foregoing problem. The cable stub assembly includes a length of cable which includes a core comprising a plurality of conductors with each of two spaced portions of the core being enclosed in at least one jacket. At least one of the portions is destined to be connected to a cable which is pressurized with a gaseous medium. A sleeve which is made of an irradiation cross-linked polyolefin material is disposed in sealed compressive engagement with the at least one jacketed portion of the cable. The sleeve has an inner surface which is coated with an adhesive material which provides a seal between the sleeve and the jacket. A length of tubing which is made of a plastic material encloses portions of the jacketed portions and exposed conductors of the core between the jacketed portions. A plastic filling material is disposed in the tubing and is adhered to an outer surface of the sleeve to prevent the escape of the gaseous medium from the at least one portion of the length of cable.

If the cable includes a metallic shield and multiple jackets, portions of the outer jacket and shield are removed to expose a portion of the inner jacket and a portion of the inner jacket is removed to expose the conductors of a length of the core. Then a heat shrinkable sleeve which is made of an irradiation cross-linked polyolefin material and which has an inner surface coated with an adhesive material is positioned over the cable adjacent to one end of the exposed core such that one segment of its length covers a portion of the outer jacket and shield and another segment covers a portion of the inner jacket. A second heat shrinkable sleeve is positioned in a similar manner adjacent to the other end of the exposed core. Openings are formed in each heat shrinkable sleeve to accommodate posts of grounding clamps which are connected to the metallic shield adjacent to each end of the exposed core. The heat shrinkable sleeves are caused to contract about the end portions of the jackets and the adhesive material on the inner surfaces of the sleeves forms seals between the sleeves and the jackets. The engagement of the contracted sleeves with the cable jackets prevents the loss of the gaseous medium from spaces between the sheath components. A sealing tape which has been prepositioned about each of the grounding clamp posts between the outer jacket and each heat shrinkable sleeve completes the seal about the posts wihich protrude through the openings formed in the sleeves.

In order to facilitate a filling operation, one end of the tubing is closed such as with an end cap disposed about the cable at a location spaced from the exposed conductors. Then a craftsperson moves the tubing over the end cap so that the contracted sleeves and exposed conductors are enclosed within it. The portion of the cable which includes the tubing is caused to be disposed vertically with the end cap oriented downwardly. A polyurethane material is introduced into the tubing to encapsulate the exposed conductors and to contact the contracted sleeves. The polyurethane adheres sufficiently to the outer surfaces of the contracted sleeves to prevent substantially any loss of the gaseous medium.

BRIEF DESCRIPTION OF THE DRAWINGS

Other features of the present invention will be more readily understood from the following detailed description of specific embodiments thereof when read in conjunction with the accompanying drawings, in which:

FIG. 1 is an elevational view partially in section of a cable stub assembly of this invention;

FIG. 2 is a schematic view of the cable stub assembly as used to interconnect two cables, at least one of which is pressurized;

FIG. 3 is a detail view partially in section of a portion of the cable stub assembly of FIG. 1 which includes provisions for providing a seal about a post of a grounding clamp assembly;

FIG. 4 is an elevational view partially in section of a prior art cable stub assembly;

FIGS. 5A-5I are a sequence of views which depict the steps of a method of this invention to prepare the cable stub assembly of FIG. 1; and FIG. 6 is an elevational view partially in section of another embodiment of this invention.

DETAILED DESCRIPTION

Figures 5G, 5H, 5I:
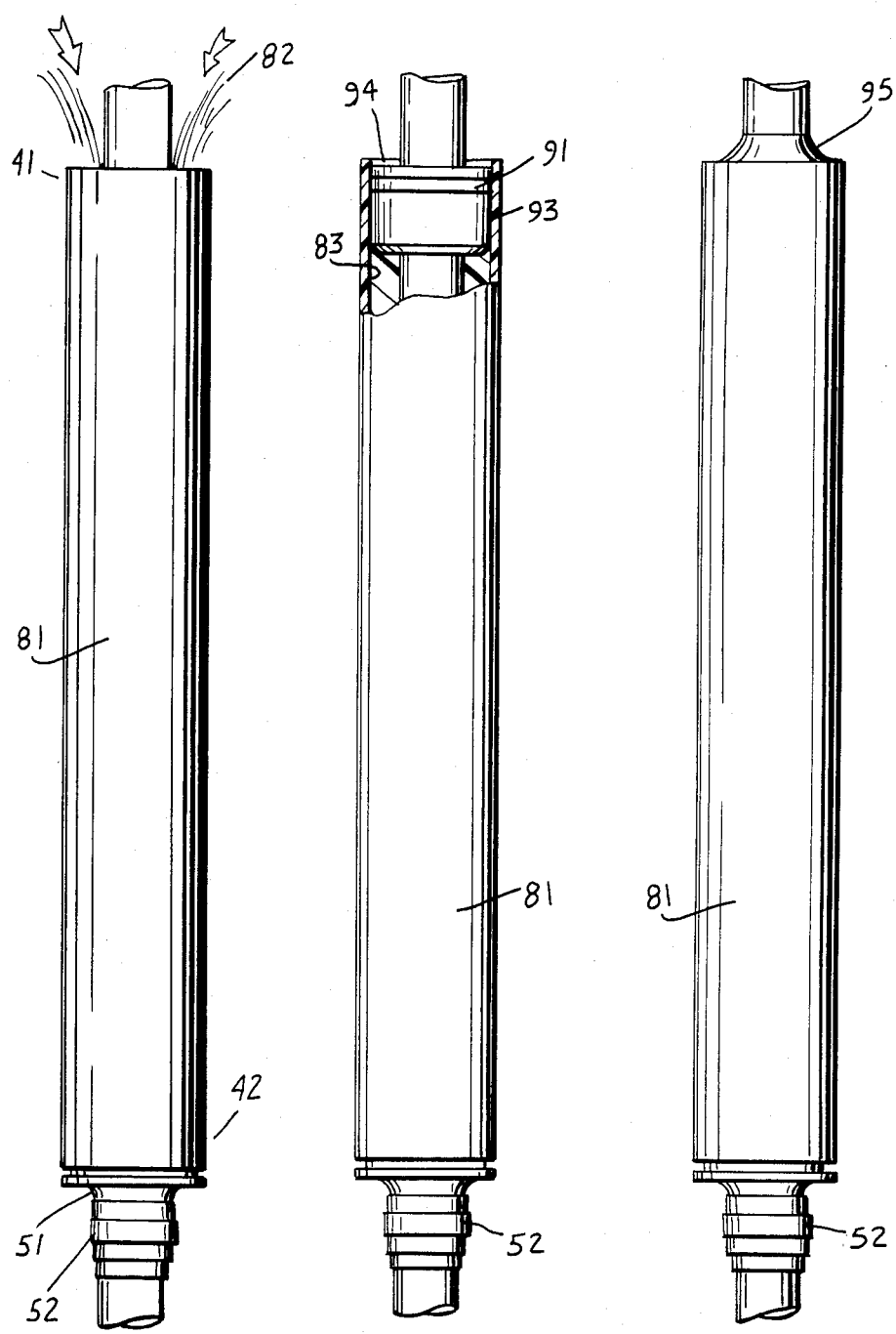

Referring now to FIG. 1, there is shown a cable stub assembly which is designated generally by the numeral 20. In a preferred embodiment, it is used to interconnect two cables at least one of which pressurized. This can be seen by viewing FIG. 2 wherein the cable stub assembly 20 is connected to a pressurized cable 22 by a splice 26 and is connected to a non-pressurized cable 24 by a splice 28. The cable stub assembly 20 includes provisions for preventing substantially the escape of a gaseous medium which is used to pressurize at least the cable 22. In the field, it is only necessary to splice one end of the cable stub assembly 20 to the pressurized cable 22 and provide a gas-tight enclosure for the splice. The other end of the assembly 20 is spliced to an end of the non-pressurized cable 24.

As can be seen in FIG. 1, the cable stub assembly 20 includes a length of cable 31 having a cable core 32 comprising a plurality of individually insulated conductors 33—33. The core 32 is enclosed in a sheath system 34 comprising an inner jacket 35, a metallic shield 37 (see FIG. 3) and an outer jacket 39.

In order to provide a cable stub assembly which provides an effective barrier to the egress of the gaseous medium, a portion of the sheath system 34 must be removed to expose a length 40 of the core 32. A location intermediate ends 41 and 42 of the cable 31 is selected and the outer jacket 39 and metallic shield 37 are removed for a distance to each side of that location. Then a shorter length of the inner jacket 35 is removed from the cable 31 to expose the individually insulated conductors 33—33.

A prior art cable stub assembly 43 is shown in FIG. 4. Therein a sealing tape 44 is wrapped about the outer and inner jackets 39 and 35, respectively. The tape 44, which engages the plastic jacket material adheres to the plastic jacket which may be scuffed, and a tape 45 which is wound about the tape 44 is such that it adheres to a plastic filling material. A length of tubing 46 is disposed about the length of cable to enclose the exposed conductors and portions of the inner jacket, metallic shield and outer jacket to each side thereof. Continuity between ends of the metallic shield 37 is provided by a grounding system 47. End caps 48—48 enclose the ends of the tubing 46 and a polyurethane material 49 fills the interstices between the conductors 33—33 and the space between the cable and the tubing.

The cable stub assembly 20 of this invention includes a barrier which prevents the egress of the gaseous medium when the length of cable 31 (see FIG. 5A) is interposed between the cables 22 and 24 and which differs from that shown in FIG. 4. A barrier is provided on each side of the length 40 of the exposed conductors 33—33 to avoid the possibility of joining the nonbarrier side of a cable stub assembly having only one barrier to the nonpressurized cable 24 in the field.

A flanged end cap 50 (see FIGS. 1 and 5B) which is made of a high density polyethylene material is moved over one end of the cable, along the cable over the exposed conductors 33—33 and to a location on the other side of the exposed conductors. Its distance from the center of the exposed length 40 of the cable core 32 is about one-half of the total length of the portion of the cable stub assembly 20 which is destined to be enclosed. In a preferred embodiment, the end cap 50 is provided with a neck 51. A plastic tape 52 is wrapped about the neck 51 of the end cap 50 to seal the end cap in engagement with the outer jacket 39 (see FIGS. 1 and 5C).

Next, a craftsperson takes steps to carry the electrical continuity of the metallic shield 37 across the exposed length 40. This is accomplished by providing the exposed shield 37 on each side of the exposed core with a grounding clamp 53 (see FIGS. 1 and 3). The grounding clamp 53 may be one such as that shown in D. J. Smith's U.S. Pat. No. 3,499,972. In order to accommodate an inner plate 54 (see FIG. 3) of the grounding clamp, the craftsperson cuts a slot 55 (see FIG. 5C) in the outer jacket 39 and the metallic shield 37. The inner plate 54 of the clamp 53 which is moved under the cable shield 37 includes a post 56 upstanding therefrom and protruding through the slot 55 in the outer jacket 39 and the metallic shield 37.

It should be realized that other grounding clamps may be used with the cable stub assembly 20 of this invention. For example, a suitable grounding clamp is shown in R. G. Baumgartner et al U.S. Pat. No. Re. 28,468 which issued on July 8, 1975. It includes an inner plate and an outer plate and a post which abuts the peripheral edge of the jacket and metallic shield.

In the next step of the method of preparing the cable stub assembly 20, a portion 58 (see FIG. 3) of a sealing tape is provided with an opening 59 and positioned over the post 56 of each grounding clamp 53. This tape is effective to provide a seal about the post 56 and prevent the escape of the gaseous medium therealong. The sealing tape portion 58 is one which is well known for use in sealing splice cases and associated distribution terminals. It is made of a tacky material comprising a plasticized synthetic rubber which includes carbon black. Such a tape is available commercially from the Graybar Company under the designation B-sealing tape.

A heat shrinkable sleeve 61 is moved over the one end 42 of the cable 31, and past the exposed portion 40 (see FIG. 5D) of the core 32. It is positioned with a portion 63 (see FIG. 3) thereof being disposed over the outer jacket 39 and with a portion 65 over the inner jacket 35. The sleeve is made of an irradiation crosslinked polyolefin material and more particularly of an irradiation cross-linked polyethylene. Such a sleeve is available from the Raychem Company of Menlo Park, Calif. under the designation WCSM. These WCSM heavy-wall sleeves are described in Raychem catalog file 82-3 dated March 1982. The sleeve 61 is provided with an opening 67 to accommodate the post 56 of the grounding clamp 53. Another heat shrinkable sleeve 66 is positioned over the outer jacket 39 and the inner jacket 37 on the opposite side of the exposed portion 40 of the core 32.

In the preferred embodiment, the inner surface of each sleeve is precoated with a hot melt adhesive such as for example that marketed by the 3M Company under the designation Jet-Melt adhesive 3764. These adhesives are solvent-free thermoplastic resins that become fluid when heated.

Then the craftsperson positions a top plate 68 of the grounding clamp 53 over each post 56 and causes it to engage the outer jacket 39 (see FIG. 5D). A nut 69 is turned along each post 56 to hold the top plate in position and cause the bottom plate to be drawn up tightly in engagement with the metallic shield 37.

Sufficient heat energy is applied to each sleeve 61 and 66 to cause it to contract about the cable (see FIG. 5E). The sleeves 61 and 66 are exposed to a temperature in the range of about 300°-400° F. As the sleeves 61 and 66 contract, a portion of each engages tightly the outer jacket 39 and another portion engages tightly the inner jacket 35 (see also FIG. 3). As the sleeves are contracted about the jackets 39 and 35, the applied heat energy is sufficient to cause the internal coating to melt and flow. Upon cooling, it provides seals between the sleeves 61 and 66 and substantially the entire peripheries of portions of the outer and inner jackets 39 and 35. When each sleeve is contracted down about the cable, the upstanding post 56 of the grounding clamp 54 protrudes through the opening 67 thereof. The portions 58—58 of sealing tape positioned over the posts 56—56 (see FIG. 3) between the jacket 39 and the sleeve 61 and between the jacket and the sleeve 66 are effective to seal the areas about the posts. The heat energy applied to cause the heat shrinkable sleeves 61 and 66 to be drawn down on the cable is sufficient to cause the tape portions 58—58 to form the seals about the posts 56—56. Also, the hot melt adhesive cooperates with the sealing tape portions 58—58 to seal the openings in the sleeves 61 and 66 through which the posts 56—56 of the grounding clamps 53—53 protrude.

As can be seen in FIGS. 1 and 3, the draw down of the sleeves 61 and 66 about the inner and outer jackets 35 and 39, respectively, creates a step 73 at the peripheral edge of the outer jacket (see also FIG. 5E). This forms a void which mitigates against the continuous engagement of the sleeves with portions of the jackets. The hot melt adhesive fills the void at the step 73 to continue the contiguous engagement of the sleeves 61 and 66 with the cable across the step.

After the sleeves 61 and 66 have been drawn down about the cable jackets 39 and 35, the conductors 33—33 are splayed and the grounding connection between the portions of the cable across the exposed portion 40 is completed. A grounding strap 78 is attached to the upstanding posts 56—56 (see FIGS. 3 and 5F).

A craftsperson then positions a length of tubing 81 (see FIGS. 1 and 5G) which is made of a high density polyethylene material on the cable. One end of it is caused to be aligned with the end cap 50 and its other end to be spaced generally an equal distance on the other side of the exposed portion 40 of the core. Turns of a sealing tape (not shown) may be applied to the joint between the tubing 81 and the end cap 50. The length 31 of cable is held with a longitudinal axis of the length of tubing 81 being generally vertical and with the end cap 51 being oriented downwardly. The craftsperson introduces a curable plastic filling material 82 (see FIG. 5G) into the sleeve 81. In a preferred embodiment, a polyurethane plastic material is used to fill the tubing and contact the sleeves 61 and 66 and to fill the interstices among the splayed conductors 33—33. It contacts an inwardly facing surface 83 (see FIG. 1) of the tubing 81 and adheres to outer surfaces of the sleeves 61 and 66 to seal the cable stub assembly. The end cap 50 prevents the filling material from escaping the sleeve 81. In the preferred embodiment, the tape 52 which is wrapped about the neck 51 insures against the escape of the filling material in its fluid state.

Afterwards, the craftsperson may move a second end cap 91 (see FIG. 5H) along the cable into position at an opposite end 93 of the tubing 81 to complete the enclosure. Additional polyurethane material may be shaped about an end 94 of the sleeve to form a neck-like portion 95 (see FIg. 5I) which resembles that at the other end of the sleeve.

Although the filling material is initially in a fluid state, it cures by exposure to ambient conditions. Generally, this occurs over a period of about twenty-four hours.

In one embodiment, the cable stub assembly 20 is provided with a liner 97 (see FIG. 6). The liner 97 which is made preferably of a polyester plastic material is disposed between the conductors 37—37 and the tubing 81 and may or may not engage the tubing. It has been found that the filling material 82 adheres to an inner surface of the liner 97.

The cable stub assembly 20 of this invention provides an effective barrier to the escape of the gaseous medium from within the pressurized cable. It has been determined that any loss of the gaseous medium is less than about 0.04 cubic cm per hour. The heat shrinkable sleeves 61 and 66 which are drawn down over the outer and inner jackets 39 and 35, respectively, prevent the escape of the gaseous medium from between components of the sheath system 34. For example, but for the tubing, the gaseous medium could travel longitudinally between the metallic shield 37, which may be corrugated, and the outer or inner jacket and escape. Also, the conductors 33—33 of the core are spread apart to insure that the filling compound occupies the interstices among the conductors 33—33.

Further, the heat shrinkable sleeves 61 and 66 prevent the escape of any of the gaseous medium between the inner surfaces of the sleeves and the cable jackets 39 and 35. This is accomplished by the compressive engagement of the sleeves 61 and 66 with the jackets in cooperation with the seals formed by the adhesive between the sleeves and the jackets.

Egress of the gaseous medium between the outer surfaces of the sleeves 61 and 66 and the filling material 82 is also prevented. It has been found that the filling material 82 adheres to the oxidized outer surface of the irradiation cross-linked material of the sleeves 61 and 66 as well as to the inner surface of the liner 97.

This invention may be used to provide an effective barrier to the escape of a gaseous medium from a cable which includes only the core 32 and a single jacket. For that use, a heat shrinkable sleeve having an inner surface coated with the hot melt adhesive material forms a seal with the jacket and a seal with the polyurethane material which is disposed within the length of tubing 81.

Also, the invention may be used to provide an effective barrier to the escape of a gaseous medium from a cable which includes the core 32, metallic shield 37 and a single jacket. In that situation, it is common to remove a sufficient length of the jacket to expose not only a portion of the core 32 but also portions of the shield on each side of the exposed core. The heat shrinkable sleeves 61 and 66 may be positioned over the ends of the jacket which are adjacent to the exposed core and turned down to engage the shield 37 or may be extended over the shield and its grounding clamps. What is important is that each sleeve is in sealed compressive engagement with the jacket and in sealed engagement with the polyurethane potting material.

It is to be understood that the above-described arrangements are simply illustrative of the invention. Other arrangements may be devised by those skilled in the art which will embody the principles of the invention and fall within the spirit and scope thereof.

What is claimed is:

1. A cable stub assembly for connecting a cable which is pressurized with a gaseous medium to another cable, said assembly comprising:

a length of cable which includes a core comprising a plurality of conductors and a jacket which encloses spaced portions of the core with one of the portions enclosed by the jacket destined to be connected to the cable that is pressurized with the gaseous medium;

at least one sleeve which is made of an irradiation cross-linked polyolefin material and which has an inner surface that is coated with an adhesive material, said sleeve being disposed in sealed compressive engagement with the one portion of the length of cable that is destined to be connected to the cable that is pressurized with the gaseous medium;

a length of tubing which is made of a plastic material and which encloses portions of the portions that are enclosed in the jacket and conductors of the core between the portions that are enclosed in the jacket; and a plastic filling material which is disposed within said tubing and which is adhered to an outer surface of said sleeve to prevent the escape of the gaseous medium from the pressurized cable.

2. The cable stub assembly of claim 1, wherein each of the jacketed spaced portions that are enclosed by the jacket is provided with a sleeve which is made of an irradiation cross-linked polyolefin material, which has an inner surface coated with an adhesive material and which is in sealed compressive engagement with the jacket.

3. The assembly of claim 1, wherein said length of cable includes a metallic shield which encloses the conductors and which is enclosed by the jacket, a portion of which has been removed to expose the conductors, and a grounding clamp positioned adjacent to each end of the exposed conductors, each said grounding clamp including a post upstanding from a base which engages said shield and wherein said sleeve includes an opening through which a post extends and said assembly includes a length of sealing tape which is disposed over the post between said cable jacket and said sleeve to seal said opening through said sleeve.

4. The assembly of claim 3, wherein said cable includes an inner jacket and an outer jacket with said metallic shield being interposed between said jackets and with portions of said outer jacket and said metallic shield adjacent to the exposed conductors being removed from said inner jacket, wherein a portion of said sleeve is in sealed compressive engagement with said outer jacket and another portion is in sealed compressive engagement with said inner jacket, and wherein said adhesive material which is coated on the inner surface of said at least one sleeve is effective to fill a void formed by a step between said outer and inner jackets and said sleeve.

5. The assembly of claim 1, wherein the exposed conductors of the core between the jacketed portions of the length are splayed with said plastic filling material being disposed in the interstices among the exposed conductors.

6. The assembly of claim 1 which also includes an end cap which is disposed about said cable at one end of said length of tubing to prevent the escape of said filling material.

7. The assembly of claim 6, wherein said end cap is made of a polyethylene plastic material.

8. The assembly of claim 1, wherein said plastic filling material is a polyurethane plastic material.

9. The assembly of claim 8, which also includes a liner which is disposed within said length of tubing, said liner comprising a polyester plastic material to which said polyurethane material is adhered.

10. A method of making a cable stub assembly, said method including the steps of:

removing a jacket from an interior portion of a length of a cable to expose individual conductors of the cable;

moving a heat shrinkable, irradiation cross-linked polyolefin sleeve which has an inner surface coated with an adhesive material over each portion of the cable which is adjacent to the exposed conductors such that a portion of each sleeve engages an end portion of the jacket;

applying sufficient heat energy to each sleeve to melt the adhesive on its inner surface and to cause the sleeves to contract into sealed compressive engagement with the jacket;

positioning a length of plastic tubing over the sleeves so that it extends to each side of the exposed conductors and is disposed generally concentrically about the cable;

closing one end of the tubing; and introducing a curable plastic material into the tubing, the plastic material adhering to the sleeves to prevent the loss of a gaseous medium which is introduced subsequently into at least one portion of the cable length.

11. The method of claim 10, wherein the curable plastic material is a polyurethane plastic material.

12. The method of claim 10, wherein the step of closing one end of the tubing includes moving an end cap along the cable to a location which is spaced from the exposed conductors and which coincides generally with one end of the tubing, the end cap also being effective to center the cable within the tubing.

13. The method of claim 12, wherein a second end cap is moved over the cable at the other end of the tubing after the curable plastic material has been introduced into the tubing.

14. The method of claim 10, wherein the cable includes a metallic shield, and the method includes the step of removing a length of the shield from a center portion of the cable along with the jacket, providing an electrical connection between the shield and a portion of a grounding clamp on each side of the exposed conductors, providing the sleeve with an opening which is adapted to receive a post of the grounding clamp, positioning a length of sealing tape over the post of each grounding clamp in engagement with the jacket prior to the step of moving the sleeves over the jacket wherein the step of moving the sleeves over the jacket is accomplished to cause the posts of the grounding clamps to extend through the openings in the sleeves, interconnecting the grounding clamps through a strap having its ends connected to the posts of the grounding clamps, and wherein said step of applying heat energy causes the lengths of sealing tape to provide seals about the posts.

15. The method of claim 14, wherein the cable includes an inner jacket and an outer jacket with the metallic shield interposed therebetween, wherein said method includes the steps of removing a portion of said inner jacket and a portion of the outer jacket such that the inner jacket is exposed, wherein the step of moving each sleeve includes positioning each sleeve with one portion thereof engaging the outer jacket and another portion engaging the inner jacket, and wherein said step of applying heat energy causes portions of the sleeve to be in sealed compressive engagement with the outer and inner jackets.

16. The method of claim 11, wherein a liner which is made of a polyester material to which the polyurethane material becomes adhered is interposed between said tubing and said cable prior to said step of introducing the curable plastic material.

* * * * *